(12) United States Patent
Hunter

(10) Patent No.: US 7,100,652 B2
(45) Date of Patent: Sep. 5, 2006

(54) ADJUSTABLE POWER TOOL ATTACHMENT FOR TABLE SAWS

(76) Inventor: Robert E. Hunter, 685 Rt. 32, Highland Mills, NY (US) 10930

( * ) Notice: Subject to any disclaimer, the term of this patent is extended or adjusted under 35 U.S.C. 154(b) by 0 days.

(21) Appl. No.: 10/701,703

(22) Filed: Nov. 5, 2003

(65) Prior Publication Data
US 2004/0250904 A1 Dec. 16, 2004

Related U.S. Application Data

(60) Provisional application No. 60/449,825, filed on Feb. 25, 2003.

(51) Int. Cl.
*B25H 1/00* (2006.01)
(52) U.S. Cl. .................. 144/286.5; 144/287; 83/477.2
(58) Field of Classification Search ............ 144/286.1, 144/286.5, 287, 134.1; 83/469, 471, 477.1, 83/477.2
See application file for complete search history.

(56) References Cited

U.S. PATENT DOCUMENTS

| 3,734,151 A | * | 5/1973 | Skripsky | 144/286.5 |
| 4,276,799 A | * | 7/1981 | Muehling | 83/473 |
| 4,281,570 A | * | 8/1981 | Hill | 83/477.2 |
| 4,546,804 A | * | 10/1985 | Haeger | 144/1.1 |
| 4,887,653 A | * | 12/1989 | Thomas | 144/286.1 |
| 5,016,358 A | * | 5/1991 | Rice et al. | 33/569 |
| 6,216,575 B1 | * | 4/2001 | Dils | 83/522.17 |
| 6,418,829 B1 | * | 7/2002 | Pilchowski | 83/397 |

* cited by examiner

*Primary Examiner*—Bena Miller

(57) ABSTRACT

An adjustable power tool attachment for table saws comprises an extension table to enlarge the table saw work surface, and a power tool attached to the bottom of a drop-in plate inserted into the extension table. The power tool can be vertically adjusted to a desired position, and can be lowered below the extension table surface. The table saw and power tool can be used sequentially, and the table saw fence can be used to guide boards or other workpieces to the table saw or power tool. A dado attachment or other power tool can be used in convenient proximity to a table saw for sequential operations, without the user replacing the table saw blades with other cutting elements, or duplicating expensive equipment.

8 Claims, 3 Drawing Sheets

ADJUSTABLE POWER TOOL ATTACHMENT FOR TABLE SAWS

This application claims the benefit of Provisional Patent Application Ser. No. 60/449,825 files Feb. 25, 2003.

FIELD OF THE INVENTION

The present invention is in the field of new and improved attachments for table saws.

BACKGROUND OF THE INVENTION

Persons who own or use power woodworking tools often use table saws and other power woodworking tools in close succession, while shaping and assembling wooden boards and other workpieces into finished products including furniture. Typically, wooden boards and other workpieces are sawed into components by use of a table saw, which may then be joined together by use of dados (rectangular grooves) formed in one or more components, into which other components may be fitted and fastened. The separate operations of sawing and of dado formation may be performed by separate tools or by changing components of a single tool.

Performance of successive woodworking operations, including sawing wooden boards and forming dados in such boards, can be greatly enhanced by the use of separate tools in convenient proximity. Additionally, production of larger finished products including furniture can be greatly enhanced by enlargement of the work surface of a conventional table saw, and table saws are commonly provided with connecting means, to which extension surfaces (wings), available as accessories, can be connected. (U.S. Pat No. 3,695,189).

Conventional dado blades are readily available, which are designed to replace the circular saw blades of a conventional table saw, and can be used to form the dado or dados of the desired width and depth in wooden boards or other workpieces.

The need for the combination of a conventional table saw and a dado-forming tool, in convenient proximity in an enlarged work surface, is demonstrated by the joining of two table saws, one of which is permanently fitted with dado blades (Appendix 1, Popular Woodworking, Issue #135; August 2003, Pages 64–65). However, this equipment combination is very expensive, and requires more space than is available to many users.

The use of a single table saw, by replacement of the existing table saw blade with such dado blades whenever a dado is required, has important disadvantages. Such replacement requires that use of the table saw must be interrupted; removal of the circular table saw blade and its replacement by the dado blades requires significant time, the use of tools and manual dexterity; the vertical position of the dado blades must be adjusted and verified and the dado blades must be removed and replaced by the saw blade for the next work phase and the vertical position of the saw blade must be adjusted. Users often drop parts, such as the nut or washer used to retain the table saw and dado blades, while replacing the blades. Multiple repetitions of these steps are required in the fabrication of furniture and other products.

Combining several power tools in a single machine has been disclosed in various complicated devices (U.S. Pat. No. 1,030,598; U.S. Pat. No. 3,734,151; U.S. Pat. No. 4,265,283; U.S. Pat. No. 5,865,228; U.S. Pat. No. 5,890,521) and combining a table saw with another power tool mounted on an extension wing has been disclosed (U.S. Pat. No. 4,887,653).

However, a power tool attachment for a table saw has not been disclosed that is adjustable, lightweight and relatively simple, that can be mounted under an extension wing of a conventional table saw and that has a cutting element that can be vertically adjusted to a desired position, and lowered below the extension wing surface when not in use.

Specifically, such a power tool attachment has not been described in which the cutting element is a dado blade, a set of dado blades, or another circular cutting element such as a circular saw.

OBJECTS OF THE INVENTION

It is an object of the invention to provide a power tool attachment for a conventional table saw that will expand the work surface of the table saw, and provide in the expanded work area a power tool which can be used sequentially with the table saw to modify wooden boards or other workpieces, the power tool being vertically adjustable to obtain a desired position of the power tool's cutting element or to lower the cutting element of the power tool below the expanded work surface.

It is a further object of the invention to provide a power tool attachment to any conventional table saw that is attached to the table saw using the extension wing design and the connecting means provided by the table saw manufacturer.

It is a further object of the invention to provide a power tool attachment to a conventional table saw that is light in weight, that can be conveniently installed and removed and that is inexpensive.

It is a further object of the invention to provide a power tool attachment to a conventional table saw that incorporates a dado blade shaft, and dado blade or dado blade set.

It is a further object of the invention to provide a power tool attachment to a conventional table saw that is vertically adjustable, and that can be lowered below the work surface.

It is a further object of the invention to provide a power tool attachment to a conventional table saw that allows the table saw fence to be used to guide workpieces toward the power tool.

SUMMARY OF THE INVENTION

A power tool attachment for a conventional table saw is provided, to be attached to an extension wing of the table saw, said power tool attachment having a vertical adjustment means providing for adjusting the tool to desired position, and for lowering the tool below the wing surface.

The preferred embodiment of said power tool attachment is an adjustable dado attachment, and the preferred embodiment of said vertical adjustment means is a combination of a helical gear and a spur gear, the helical gear being affixed to an electric motor shaft, the spur gear being affixed to a dado blade shaft, and the dado blade shaft being vertically adjustable by means of a screw mechanism.

Other embodiments includes a power tool attachment other than a dado attachment, said power tool attachment being adjustable such that the portion of said power tool attachment extending above the extension table work surface may be adjusted over a desired range, and may be lowered below the extension table work surface when not in use.

DETAILED DESCRIPTION OF THE INVENTION

Figure 1:
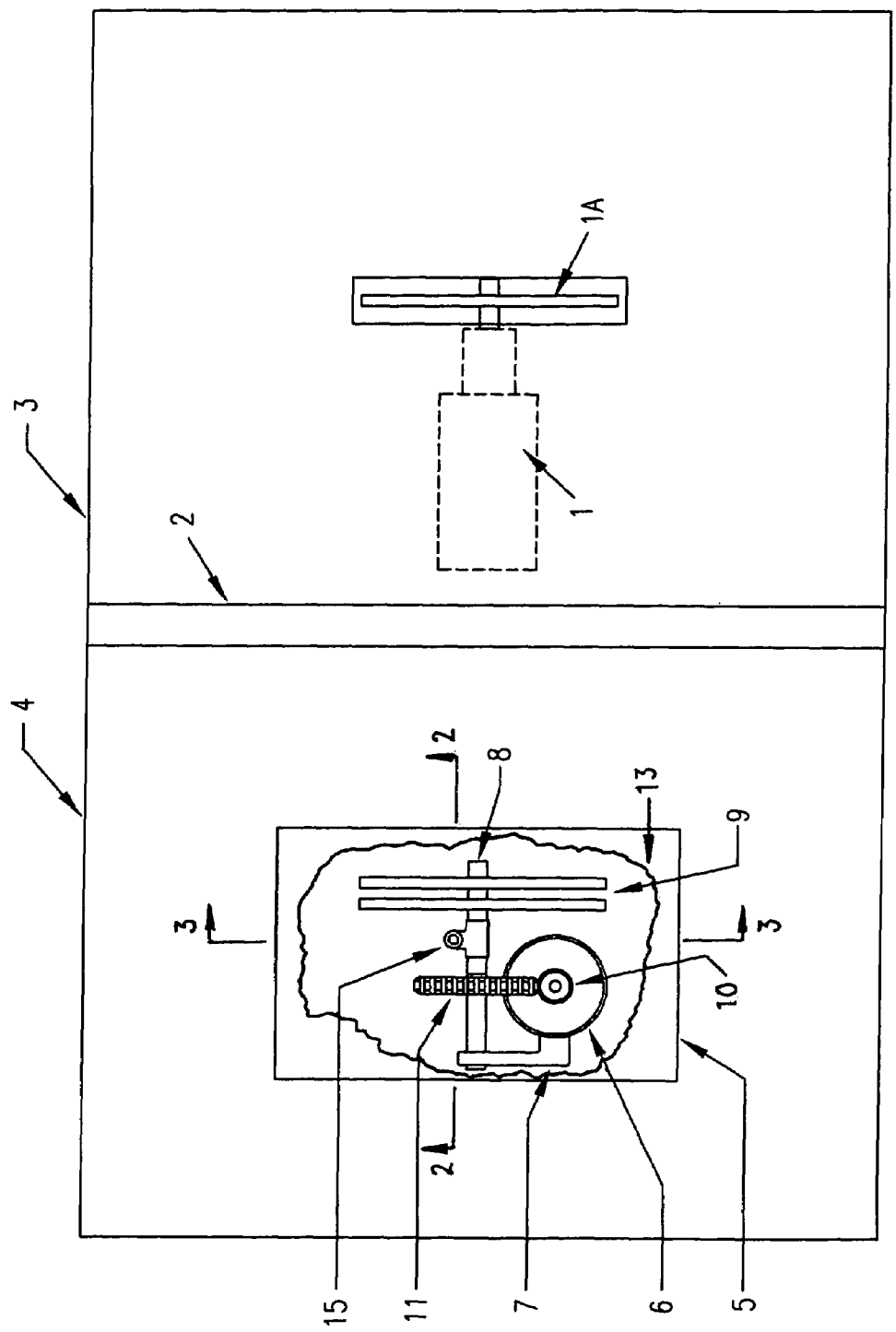
FIG. 1 is a top plan view of a table saw with an adjustable dado attachment in accordance with the present invention connected to it.
Figure 2:
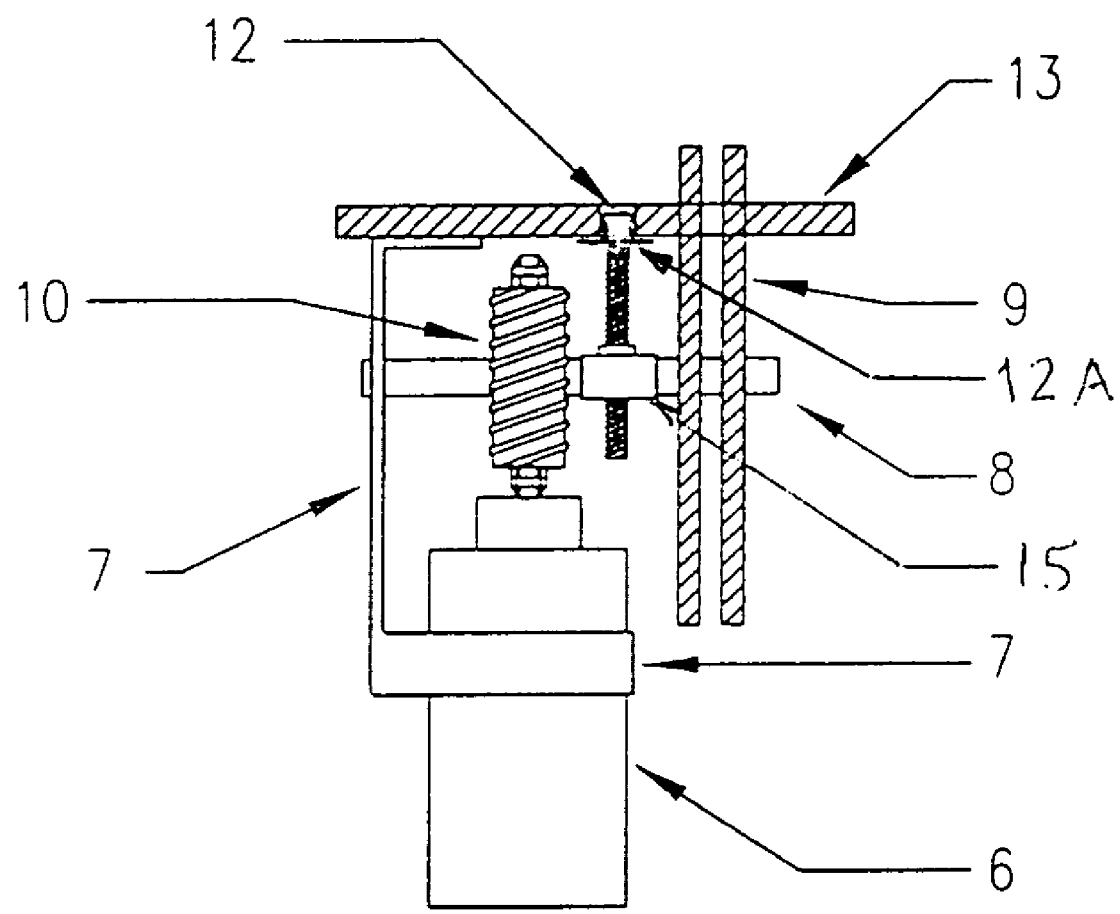
FIG. 2 is a partial cross sectional view of the device taken along line 2—2 in FIG. 1.
Figure 3:
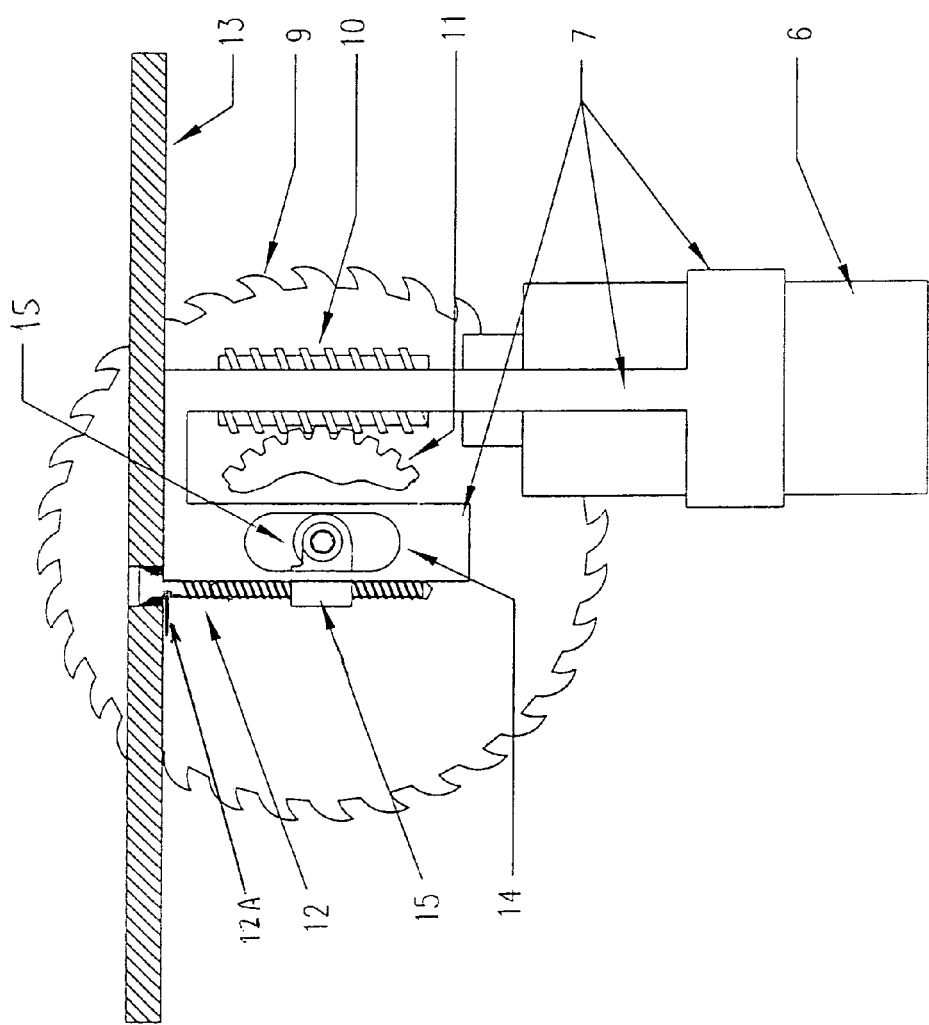
FIG. 3 is a partial cross sectional view of the device taken along line 3—3 in FIG. 1.

An adjustable dado attachment device constructed according to the present invention is illustrated in FIGS. 1–3. The dado attachment device is constructed to be attached to a conventional table saw, and includes a table extension wing designed to be connected to the table saw by the particular connecting means provided on the table saw. The device includes a motor having a transmission means for rotation of a dado blade shaft and attached dado blade, and a mounting bracket for attaching the motor to the table extension insert plate. The mounting bracket also provides stabilizing means to the dado blade shaft. The dado blade shaft extends through an adjustment and bearing housing, the adjustment and bearing housing being vertically adjustable by an adjustment screw extending from the table extension insert plate through the adjustment and bearing housing.

Referring to the drawings, there is shown in FIG. 1 a conventional table saw which comprises a table saw motor, 1, table saw blade, 1A, table saw fence, 2, and table saw wing, 3. The table saw wing, 3, provides a planar surface on which a wooden board or similar workpiece may be pushed towards the table saw blade, 1A, guided by the table saw fence, 2, which may be adjusted to varying distances from the table saw blade, 1A.

The adjustable dado attachment is shown in FIG. 1, comprising a modified table extension wing, 4, attached to table saw wing 3 by connecting means provided by the table saw, the table extension wing being modified by having a table extension wing opening, 5, into which is inserted a drop-in table extension insert plate, 13, the dado attachment further comprising an adjustable dado assembly comprising a motor, 6, motor and blade shaft mount, 7, blade shaft, 8, dado blade set, 9, worm gear, 10, spur gear, 11, and adjustment and bearing housing, 15.

Referring now to FIG. 2, the dado attachment further comprise an adjustment screw, 12, which connects the adjustment and bearing housing, 15, to the table extension insert plate, 13, and is used to adjust the vertical position of the blade shaft, 8, and dado blade set, 9. The adjustment screw, 12, is supported by the adjustment screw retaining clip, 12A, which extends into a groove in the adjustment screw, 12. The dado blade set, 9, may extend above the table extension insert plate through an opening in the table extension insert plate opening, the rectangular dado blade opening, 9A. The motor and blade shaft mount, 7, is attached to the table extension insert plate, 13, by welds, bolts and nuts, or similar means such that the dado assembly and table extension insert plate can be removed from and replaced in the modified table extension wing as a unit.

The table extension wing, 4, provides a planar surface on which wooden boards or similar workpieces may be pushed towards the dado blade, 9, guided by the table saw fence, 2, which may be adjusted to varying distances from the dado blade, 9.

Referring now to FIG. 3, the worm gear, 10, engages the spur gear, 11, such that when the motor, 6, turns the worm gear, the spur gear, 11, turns and causes blade shaft, 8, and dado blade, 9, to turn. As a consequence, a groove may be cut in a wooden board or similar workpiece which is pushed towards the dado blade.

The depth of the groove is adjusted by the vertical adjustment of the blade shaft, 8, and of the dado blade, 9, and spur gear, 11, attached to the blade shaft, vertical adjustment being accomplished by rotation of the adjustment screw, 12, within the adjustment and bearing housing, 15. The vertical adjustment of the blade shaft, 8, within the blade shaft adjustment track, 14, which is required for satisfactory dado performance, is enabled in the device shown in FIG. 1–3, by use of the worm gear, 10, and the spur gear, 11.

The power tool attachment may be constructed to be connected to any particular conventional table saw provided with connecting means for an extension wing, and the power tool attachment can serve the function of an extension wing to the table saw, by lowering of the power tool below the work surface. The table extension wing, 4, and table extension insert plate, 13, may be fabricated of cast iron, cold rolled steel, high impact plastic or any similar material. The adjustment screw retaining clip, 12A, may be a conventional c-clip, or any similar clip.

In operation, the user connects the table saw extension wing of the power tool attachment to the table saw, either with or without the table extension insert plate and its attached power tool components.

If the table saw extension wing has been connected without the table saw extension wing insert plate, the table saw extension wing insert plate, with its attached power tool assembly, is then inserted into the table saw extension wing opening.

The table saw blade and the power tool attachment cutting element are then adjusted to the desired vertical positions. Typically, the table saw blade will first be adjusted to a desired cutting position and the power tool attachment cutting element will be adjusted below the work surface, and one or more wooden boards or other workpieces will be sawed to desired dimensions; then the table saw blade will be adjusted below the work surface, the power tool attachment cutting elements will be adjusted to the desired position, and one or more workpieces will be shaped by the power tool cutting elements.

The table saw fence is adjusted to the desired distance from the table saw blade or the power tool attachment cutting element, and the wooden board or other workpiece is moved towards the table saw blade or power tool attachment cutting element with guidance of the table saw fence.

Additional operations on wooden boards or other workpieces are performed after further adjustment of the table saw blade or power tool attachment cutting element to the desired vertical positions.

Although the invention has been described in detail with references to a certain preferred embodiment, variations and modifications exist within the scope and spirit of the invention as described and defined in the following claims.

I claim:

1. In combination with a table saw comprising a table with a first work surface defining a first work area and first edge, a support for said table, a first connecting means on said edge and a saw carried by said table having a motor and saw blade, a removable power tool attachment comprising:

(a) a table extension having a second work area and second edge, said table extension having a rectangular opening in said second work area, (b) second connecting means on said table extension second edge for removably connecting said table extension to said first connecting means on said first edge, said first and second connecting means making said first and second work surfaces coplanar, (c) a rectangular table extension insert plate having a third work surface and third connecting means, and fourth connecting means in said rectangular table extension opening for removably attaching said table extension insert plate to said table extension, said third and fourth connecting means making said second and third work surfaces coplanar, (d) a power tool assembly having a dado cutting element, said power tool assembly having attachment means for attaching said power tool assembly to the bottom of said table extension insert plate, and adjustment means for vertically adjusting the position of said power tool assembly in relation to said table extension insert plate, (e) a rectangular dado blade opening in said table extension insert plate through which said power tool dado cutting element may extend, (f) said dado cutting element comprising at least one dado blade mounted on a blade shaft, said shaft extending through an adjustment and bearing housing, (g) adjustment means of said adjustment and bearing housing whereby said shaft may be vertically adjusted, such that said at least one dado blade may extend above said second work area an adjustment range of zero inches to at least ¾ inch, (h) an electric motor and a mounting bracket, said mounting bracket supporting said electric motor and having said attachment means for attaching said power tool assembly to said table extension insert plate, (i) stabilizing means of said mounting bracket, said blade shaft extending through said stabilizing means, said stabilizing means permitting vertical adjustment of said blade shaft and said at least one dado blade, throughout said adjustment range, and (j) power transmission means whereby rotation of said motor causes rotation of said blade shaft, throughout said adjustment range of said blade shaft and said at least one dado blade, whereby a user may use said power tool attachment in sequence with said table saw, without having to remove or replace said saw or power tool, and may adjust said power tool vertically to achieve a desired depth of cut in a workpiece, or to lower said power tool assembly completely below said second work area.

2. The combination according to claim 1, wherein said adjustment means comprises an adjustment screw extending to an adjustment port in said table extension insert plate, and extending through a threaded component of said adjustment and bearing housing.

3. The combination according to claim 2, wherein said power transmission means comprises a worm gear affixed to the shaft of said electric motor, a spur gear affixed to said blade shaft and engagement of said worm and spur gears.

4. The combination according to claim 3, wherein an adjustable fence guide may be adjusted to desired distances from said saw blade or said cutting element, for guiding workpieces to said saw blade or said at least one dado blade.

5. The combination according to claim 2, wherein an adjustable fence guide may be adjusted to desired distances from said saw blade or said cutting element, for guiding workpieces to said saw blade or said at least one dado blade.

6. The combination according to claim 1, wherein said power transmission means comprises a worm gear affixed to the shaft of said electric motor, a spur gear affixed to said blade shaft and engagement of said worm and spur gears.

7. The combination according to claim 6, wherein an adjustable fence guide may be adjusted to desired distances from said saw blade or said cutting element, for guiding workpieces to said saw blade or said at least one dado blade.

8. The combination according to claim 1, wherein an adjustable fence guide may be adjusted to desired distances from said saw blade or said cutting element, for guiding workpieces to said saw blade or said at least one dado blade.

* * * * *